UNITED STATES PATENT OFFICE 2,457,945

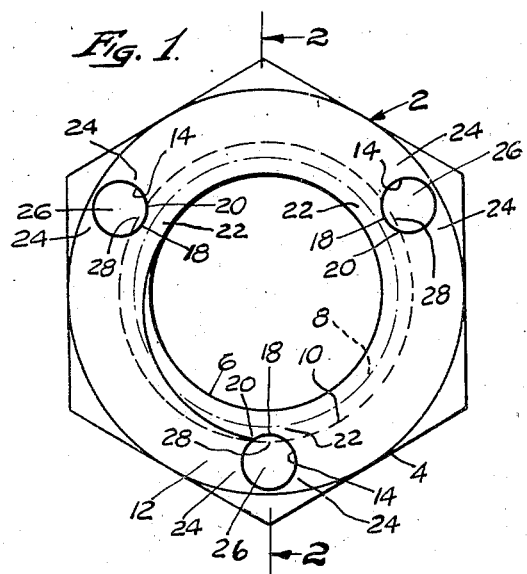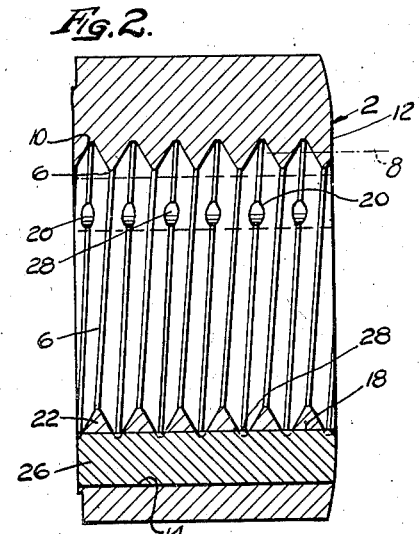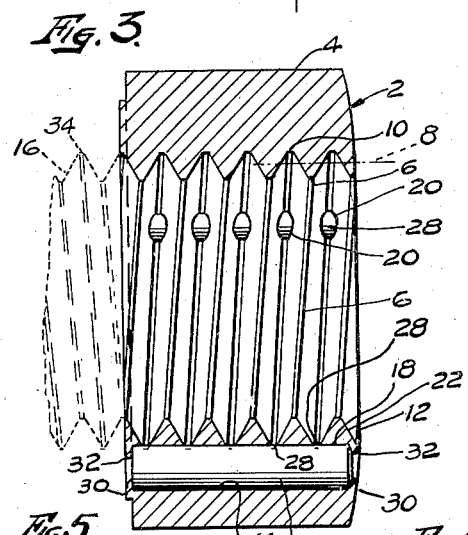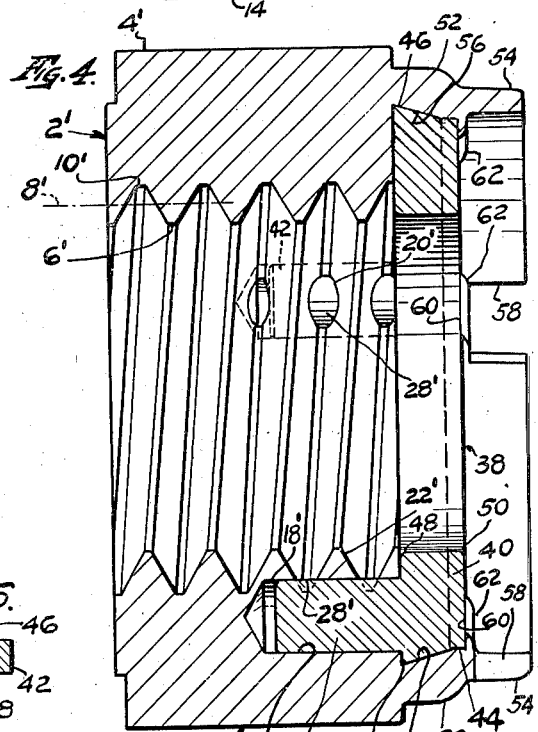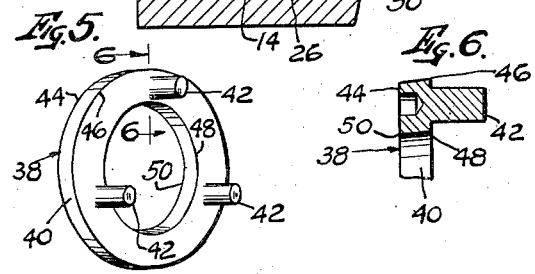

SELF-LOCKING NUT MEANS AND THE LIKE

Adolph F. von Soden, Los Angeles, Calif.

Application March 2, 1944, Serial No. 525,185

3 Claims. (Cl. 151—7)

My invention relates to self-locking nut and has particular reference to the manufacture of that type of self-locking nut which when threaded and assembled as herein provided and applied to and over a cooperating bolt or screw, will result in a continuous axial thrust exerted upon the threads of said bolt or screw caused by pressing of each and every thread by means of an elastic member or a plurality of elastic members disposed in said nut, which produces a self-locking action due to the frictional resistance imposed upon said threads of said bolt or screw when disposed within the threads of said nut.

Accordingly an object of my invention is to provide a nut which may be of narrow construction, generally called a jam nut, or which may be of any length as in practice may be most desirable, such as the standard nut or the castellated nut, and which is provided with one or a number of inserts, such as fiber or plastic, each of which being disposed at and cutting through the root diameter of the thread which is the total depth to which said thread of a nut is cut, and thereby protruding partially through each and every thread at one place or at intervals, so that when the cooperating thread of a bolt or screw passes into the thread convolutions of said nut, said elastic inserts will press upon and will straddle the thread so disposed therein, and thereby will lock and hold said nut in place and will prevent it from becoming unscrewed when said bolt or screw and nut are subjected to vibrations.

Another object of my invention is to provide a nut with one or a plurality of elastic inserts, each of which is disposed longitudinally within the body of said nut and transversely to the thread convolutions of said nut and having each of said elastic inserts disposed partially over the root and close to the pitch diameter of said thread, thus causing the cooperating thread of a bolt, when screwed into said nut, to be wedged-in and pressed by means of said elastic inserts at each and every thread throughout the entire length of said nut, and thereby in correlation to the number of threads or pitch of said nut increasing the hold and the lock of said nut upon the threads of the bolt.

Further object of my invention is to provide a nut of any desired thickness with a plurality of elastic inserts each of which is disposed longitudinally within the nut body and transversely passing over the root and close to the pitch diameter of the thread convolutions and each insert being held firmly in place to provide a binding and pressing action upon the threads of a bolt and thereby locking said nut in place and preventing same from becoming loose due to vibrations.

Another object of my invention is to provide a nut having a plurality of elastic inserts disposed longitudinally within the nut body and positioned transversely passing over the root of the thread and close to the pitch diameter of the thread convolutions, each elastic insert being disposed within its socket and having means, at the face section of said nut, for crimping and for locking said inserts in place and to prevent same from slipping out of said sockets, said inserts providing a binding and pressing action upon the threads of a bolt when disposed within the threads of said nut and thereby preventing said nut from becoming loose due to vibrations.

A further object of my invention is to provide a nut having a body and the thread, said body having an angularly formed annular recess means for forming a rim means, also having a plurality of socket means disposed longitudinally and within said nut body which are positioned within said annular recess means and at the face section thereof, lying transversely to the thread convolutions and passing partially through said threads and nearly to the pitch diameter thereof, also, having an elastic insert ring means disposed within said annular recess means of which a plurality of insert extensions are disposed within each of said socket means, said annular rim means having a plurality of castellations which are cut close to the thickness of said insert ring means for providing suitable crimping means adapted for holding said insert ring means in place when wedged within said angularly formed annular recess means, so that, when the cooperating thread of the bolt or screw passes into the thread convolutions of said nut, said longitudinally extending insert extensions will press upon the passing thread edges and thereby will hold said elastic insert ring in position, thus allowing the thread groove to be formed within said ring means and thereby, in combination, holding said nut upon the thread of the bolt or screw and preventing same from becoming loose due to vibrations.

Still further object of my invention is to provide said nut with a suitable ring means, said ring means made preferably out of semi-rigid or semi-elastic fibre, or, a semi-elastic plastic material, also said ring means having a circular structure of which the outside diameter is provided with a slight angular edge and the inside diameter having a slight taper and its dimension being nearly the root diameter of the bolt or screw thread to which it may be applied for providing a frictional binding, also, said ring means having a thickness which will accommodate at least one thread or lead of said bolt or screw, and thereby forming a flat faced ring means one side of which is provided with one or more longitudinally extending means, the diameter of which, including the length thereof corresponds to the dimensional size and the length of the socket disposed in said nut to which same is applied, said longitudinally extending means may, if so desired be made separate and be secured in place, or same may be molded as a unit and be made an integral part of said ring means, so that when disposed within the recess of said nut it may be pressed into position and then be crimped and clinched into place.

Other and further objects and advantages of my invention as will herein after more fully appear, I attain by the construction herein shown on the drawings and described in the specification, forming a part of my application.

Reference is had to the accompanying drawings in which the similar reference characters, denote the similar parts.

In the drawings.

Fig. 1 is the top plan view of a nut showing the positions of the inserts disposed within its body and interconnecting the root diameter of the nut threads.

Fig. 2 is the vertical sectional view of a nut, showing the position of the inserts, taken on the line 2—2 of the Fig. 1.

Fig. 3 shows a vertical sectional view of a nut showing the position of the inserts including means for crimping said inserts in place.

Fig. 4 shows a modified form of a nut, showing same in a vertical sectional view having the thread binding unit, comprising a ring and a set of longitudinally extending inserts applied in and to castellated nut.

Fig. 5 shows a perspective view of the thread binding unit showing the positions of the longitudinally extending inserts.

Fig. 6 shows a fragmentary sectional view of the thread binding unit, taken on the line 6—6 of the Fig. 5.

Describing my invention more in detail, in its broader aspects, said invention comprises a nut, generally designated by numeral 2, which consists of a body section 4 having the nut threat convolutions 6, said threads having a pitch line 8 and having the root of the thread as at 10.

In between said thread root 10 and the outside section of the body member 4 is formed a face, designated by numeral 12 which determines the outside diameter or size of a nut, which may be hexagon, square or round or any other configuration, as in practice may be most desirable, wherein series of suitable sockets or holes 14 are positioned, or, if so desired, one socket 14 may be used, however, it has been proven in practice that at least two sockets are preferable, whereby the bolt thread 16 (as shown in Fig. 3) may be centralized when applied into said threads 6 of said nut 2.

Said sockets or holes 14 extend longitudinally through the body member 4 which is the length or thickness of said nut 2, such as may be encountered in the thickness of the jam or check nuts, and having one portion of the diameter of said socket 14 extending over as at 18, which will reach beyond the root of the thread 10 and slightly within the marginal line of the thread pitch line 8, thus forming an aperture 20, the length of which is gaged and determined by the position of said socket 14 within said face 12 and by the outside diameter of said socket 14, while the width of said aperture 20 is maintained by the thread pitch, of whatever size it may be, thus providing said aperatures 20 by cutting same transversely through each and every thread 6, which may be the angular, square, acme or any other type of thread, exposing said aperture 20 to a degree which may be most advantageous in practice and still retaining the sectional strength of said thread 6.

Said sockets 14 may also, be of any suitable diameter which will provide sufficient wall and strength at the adjacent thread section 22 and at the outer sides 24, which are disposed near to the outside sections of the body member 4.

Within said sockets 14 suitable elastic members 26 are positioned, which may be of the fibre or suitable plastic composition, and thus exposing a portion of said elastic members 26 at each and every aperture 20 of said thread 6 and throughout the entire length or thickness of said nut 2.

In the manufacture and assembly of said nut 2 and said insert 26, said socket 14 may be drilled or punched out, having a sufficient diameter to provide an adequate aperature 20, so that the exposed section 28 of said insert 26 may be disposed over the root diameter of said thread as herein before provided, said diameter of said socket 14 is required, however, to have sufficient tolerance in its dimension, to provide a force fit for said insert 26 and thereby preventing it from shifting.

If, however, said insert 26 is loose in said socket 14, then the application of the passing cooperative thread of the screw or bolt 16, will have a rolling effect upon said insert and having sufficient force at said aperatures 20, so that a compression of the formerly made grooves will result, and a re-forming of new grooves will take place, which will have the tendency to press upon the outside thread section of said screw 16.

In cases, where it is required and more advantageous to hold said insert 26 firmly in place, then each face side 30 of said nut 2, may have the socket edges 32 crimped into place and slightly over said insert 26, as shown in Fig. 3, and thereby preventing its shifting or falling out of the place.

In operation, when the cooperative thread of the screw 16 passes into the thread convolution 6 of the nut 2, the outside edge 34 of said screw thread is forced against the exposed section 28 of said insert 26 within said aperture 20, forming therein a groove which presses and straddles the edge 34 including the thread surfaces at the point of contact, then leading further to the next insert 26 and its exposed section 28 throughout the entire length of thickness of said nut 2.

In this manner and particularly in the jam or check nuts where only few threads are used and employed, the hold and the grip upon a nut and the screw is immediate and continuous, whereas in uses of a standard nut, where one half or a portion of a nut length is at times required to be employed, particularly in case of an emergency, then in such cases, also a positive hold and lock may be had, wherein only a few threads are exposed to the locking action of said insert 26 and thereby preventing said nut 2 to become loose or become unscrewed due to vibrations.

In Figs. 4, 5 and 6 the locking means as shown is applicable to the castellated nut 36, which includes the locking method employed as previously described and illustrated in Figs. 1, 2 and 3.

In the body member 4' of said nut 36, said sockets 14' are partly drilled, or, when manufacturing large nuts, then same are cast-in or cored-out, their position is within said face 12' and having an insert member 38, which is a combination of an annular washer 40 having a set of longitudinally extending inserts 42 made an integral part thereof.

Said insert member 38 may, if so desired, be a washer having said longitudinally extending inserts made separate and pressed into place, or, same may be molded and formed as shown into one compact unit.

The outside annular section 44 of said washer 40 is provided with a slight taper for providing an angular edge 46, while the inside annular section 48 of said washer 40 is also provided with a tapered annular edge 50, the purpose of which is to eliminate the side friction and to facilitate its ejection from the mold when in manufacturing process, and further, for permitting the in-passing thread edge 34 of the screw 16, to have a slightly less resistance at the side of entry, however, a straight inside annular surface is equally effective.

The particular type of insert unit 38, as illustrated, may be applicable to any nut where a recess is cut and formed, and is adapted for receiving and for crimping said insert in place, and also, said inserts 26' or said insert unit 38 may be used in any nut which is required to be hardened.

In castellated nut a provision is made for providing an annular wall 52 which extends outwardly and terminates with a circular rim 54, of which, the inner section of said annular wall 52 is recessed as at 56 to accommodate said angular edge 46 of said washer 40. Said circular rim 54 is castellated as at 58 to a depth which is slightly above the thickness of said washer 40, thus forming a ridge section 60, the inner edge of which is used for forming an inward ledge 62, which overlaps and crimps said washer 40 into place when same is forced and wedged into position, as shown.

It may then be noted, that when the screw thread of said screw 16 enter the thread convolution 6' of said nut 2', then said outside thread edge 34 will immediately become engaged when reaching said exposed sections 28' of said longitudinally extending inserts 42, which will hold the washer 40 in its place and will prevent it from twisting or turning when in following, said thread edge 34 enters into and engages the inside annular section 48 while forcing a thread groove therein, which action will hold, press and lock said screw 16 in place.

While I have thus described my invention with great particularity, it will be clear that the same may be modified throughout a wide range.

I accordingly do not propose to be limited to the exact details of construction herein shown on the drawings and described in the specification, but reserve the rights in practice to make any and all changes and modifications therein, which may come within the scope of the appended claims.

I claim as my invention;

1. In a castellated nut of the class described, a body member, a threaded bore passing through said body member, a tapered recess at one end of said nut and extending into said body member, a plurality of sockets in said recess, extending into said body member and passing through a portion of said threads, an insert washer means having a plurality of longitudinally extending inserts and disposed in said tapered recess and said sockets, respectively, for engaging and pressing the cooperative threads of a screw when passing through the thread convolutions of said nut, a tapered annular edge at the inside section of said insert washer means for engaging the threads of cooperative screw, and ledge means at the outer edge of the wall of said recess for holding said last mentioned means in place.

2. In a castellated nut of the class described comprising a body, threads disposed in the center section of said body, an angular recess disposed at one end of said nut and extending into said body, an annular wall extending out of said recess, a plurality of sockets in said recess, each extending into the body of said nut and passing transversely and partially through said threads, apertures at the junction of said sockets with said threads, a washer insert in said recess, a plurality of longitudinally extending inserts extending from said washer insert and passing into said sockets for enclosing said apertures and for pressing and holding the threads of a second threaded member when disposed within the threads of said nut, and a plurality of inward ledge means in said annular wall of said recess for holding said last mentioned means tightly in position.

3. In a castellated nut of the class described comprising a body, threads disposed in the center section of said body, an angular recess disposed at the end face of said nut and extending partially into said body, an annular wall extending out of said recess, a plurality of slots in said annular wall, a plurality of sockets within the face of said recess extending into and passing transversely and partially through said threads, apertures at the junction of said sockets and each of said threads, a washer means in said recess, a tapered annular edge at the inside section of said washer, a plurality of longitudinally extending inserts extending from said washer and into said sockets, for enclosing each of said apertures and for pressing and locking the threads of a second threaded element when disposed in the threads of said nut, and inwardly extending ledge means in each of said slots, extending inwardly from said annular wall for holding said washer means in place.

ADOLPH F. von SODEN.

REFERENCES CITED

The following references are of record in the file of this patent:

UNITED STATES PATENTS

| Number | Name | Date |
|---|---|---|
| 595,108 | Levedahl | Dec. 7, 1897 |
| 1,158,454 | DeCamp | Nov. 2, 1915 |
| 1,804,348 | Kubacki | May 5, 1931 |
| 1,822,300 | Korner | Sept. 8, 1931 |
| 2,026,757 | Swanstrom | Jan. 7, 1936 |

FOREIGN PATENTS

| Number | Country | Date |
|---|---|---|
| 372,405 | Great Britain | May 9, 1932 |
| 490,680 | Great Britain | Aug. 18, 1938 |
| 109,769 | Australia | Feb. 7, 1939 |
| 556,469 | France | July 21, 1923 |